United States Patent [19]
Hirayama et al.

[11] Patent Number: 5,406,307
[45] Date of Patent: Apr. 11, 1995

[54] DATA PROCESSING APPARATUS HAVING SIMPLIFIED ICON DISPLAY

[75] Inventors: Tomoshi Hirayama; Hiroshi Yasuhara, both of Tokyo, Japan

[73] Assignee: Sony Corporation, Tokyo, Japan

[21] Appl. No.: 621,898

[22] Filed: Dec. 4, 1990

[30] Foreign Application Priority Data

Dec. 5, 1989 [JP] Japan ................... 1-316109

[51] Int. Cl.⁶ .............................................. G09G 1/06
[52] U.S. Cl. .................... 345/120; 345/179
[58] Field of Search ............... 340/706, 707, 709, 710, 340/712, 721, 723, 724; 178/18, 19; 345/119, 120, 163, 179, 182; 395/155, 157, 159

[56] References Cited

U.S. PATENT DOCUMENTS

| | | | |
|---|---|---|---|
| 4,686,522 | 8/1987 | Hernandez et al. | 340/721 |
| 4,720,703 | 1/1988 | Schnarel et al. | 340/721 |
| 4,763,356 | 8/1988 | Day et al. | 178/18 |
| 4,764,885 | 8/1988 | Greanias et al. | 340/708 |
| 4,899,136 | 2/1990 | Beard et al. | 340/706 |
| 4,987,411 | 1/1991 | Ishigami | 340/709 |
| 5,040,131 | 8/1991 | Torres | 345/156 |

FOREIGN PATENT DOCUMENTS

2193827  2/1988  United Kingdom .

OTHER PUBLICATIONS

Macintosh System Software User's Guide, Version 6.0—Apple, 1988.
Patent Abstracts of Japan, vol. 12, No. 138, Apr. 27, 1988, Shigeki Iguchi, "Data Managing Device".
IEEE Computer Graphics and Applications, vol. 8, No. 5, Sep. 1988, pp. 65–84; Brad A. Myers, "A Taxonomy of Window Manager User Interfaces".

*Primary Examiner*—Alvin E. Oberley
*Assistant Examiner*—Chanh Nguyen
*Attorney, Agent, or Firm*—Hill, Steadman & Simpson

[57] ABSTRACT

A data processing apparatus is provided, in which an information is inputted by using a pen from a display portion in which an input device (tablet) is stuck to a display device (display panel). If the user touches an icon displayed on this display portion for indicating various functions with a point of the pen and drags the pen along the surface of the display portion to a display position and releases the point of the pen from the panel surface of the display portion, an enlarged processing display form (i.e. window) is automatically displayed at a desired position of the display portion. Further, if the user touches the window with the point of the pen and drags the pen along the panel surface of the display portion up to the position of a desired icon, the enlarged window is automatically reduced and is stored in a vacant icon.

7 Claims, 6 Drawing Sheets

DATA PROCESSING APPARATUS HAVING SIMPLIFIED ICON DISPLAY

BACKGROUND OF THE INVENTION

1. Field of the Invention

The present invention generally relates to an information input control apparatus and, more particularly, is directed to a data processing apparatus in which information is input by using a pen from a display portion in which an input apparatus and a display apparatus are mounted one upon the other.

2. Description of the Prior Art

Conventionally, a keyboard, a mouse and the like are generally used as an information input control apparatus of a computer (hereinafter referred to as a CPU (central processing unit)). For example, if the user wants to enlarge a window of an icon on a picture screen of a display portion by using a mouse, the mouse is made operable on a tablet and a cross-shaped position designation cursor is moved on the picture screen of a display portion such as a cathode ray tube (CRT) or the like by moving the mouse. When a button on the mouse or a predetermined button on a keyboard is depressed once in order to specify a desired icon after the position designation cursor is matched with the desired icon displayed on the picture screen of the CRT, a trigger operation for taking in the icon is executed at the CPU side. Further, when the user wants to enlarge the window of the desired icon, the button on the mouse is depressed one more time, or the mouse is moved to the position at which the window is enlarged on the tablet and the button on the mouse is depressed one more time at that position, the window of the icon being thus enlarged as is instructed by the user.

According to the information input control apparatus thus arranged, the user must carry out two operations, that is, the trigger operation for designating the desired icon and the operation for displaying the window of the icon at the predetermined position in the enlarged scale, which is very cumbersome for the user. Also, the mouse is too large to move the cursor to the exact position of the desired icon properly.

OBJECTS AND SUMMARY OF THE INVENTION

Accordingly, it is an object of the present invention to provide an improved data processing apparatus which can substantially eliminate the aforenoted shortcomings and disadvantages encountered with the prior art.

More specifically, it is an object of the present invention to provide a data processing apparatus in which the user can activate or deactivate a designated function by the user when the user drags a pen.

It is another object of the present invention to provide a data processing apparatus in which a starting or ending position of a dragging operation can be designated in natural fashion.

It is still another object of the present invention to provide a data processing apparatus in which a position of a window, i.e. a position of an enlarged icon, can be determined with ease.

As a first aspect of the present invention, a data processing apparatus in which an input device and a display device are stuck one upon the other and which utilizes an electronic pen is comprised of a circuit for detecting whether or not the electronic pen touches the display portion. A circuit is provided for detecting whether or not coordinate data indicative of the position in which the electronic pen touches the display device exists at a coordinate position in which a desired icon is displayed. A circuit controls the icon display coordinate position such that the icon display coordinate position is moved in accordance with the movement of the position coordinate of the point of the pen. A circuit detects whether or not the position coordinate of the point of the pen is moved to a predetermined area and a circuit converts the icon into a window when it is detected that the point of the pen is apart from the display device within the predetermined area.

In accordance with a second aspect of the present invention, a data processing apparatus is provided in which an input device and a display device are stuck one upon the other and which utilizes an electronic pen. It is comprised of a circuit for detecting whether or not the electronic pen touches the display portion. A circuit detects whether or not coordinate data indicative of the position at which the electronic pen touches the display device exists at a coordinate position in which a desired window is displayed. A further circuit controls the window display coordinate position such that the window display coordinate position is moved in accordance with the movement of the position coordinate of the point of the pen. Another circuit detects whether or not the position coordinate of the point of the pen is moved to a predetermined area. A further circuit converts the window into an icon when it is detected that the point of the pen is apart from the display device within the predetermined area.

The preceding, and other objects, features and advantages of the present invention will be apparent in the following detailed description of an illustrative embodiment when read in conjunction with the accompanying drawings, in which like reference numerals are used to identify the same or similar parts in the several views.

DETAILED DESCRIPTION OF THE PREFERRED EMBODIMENT

Figure 1:
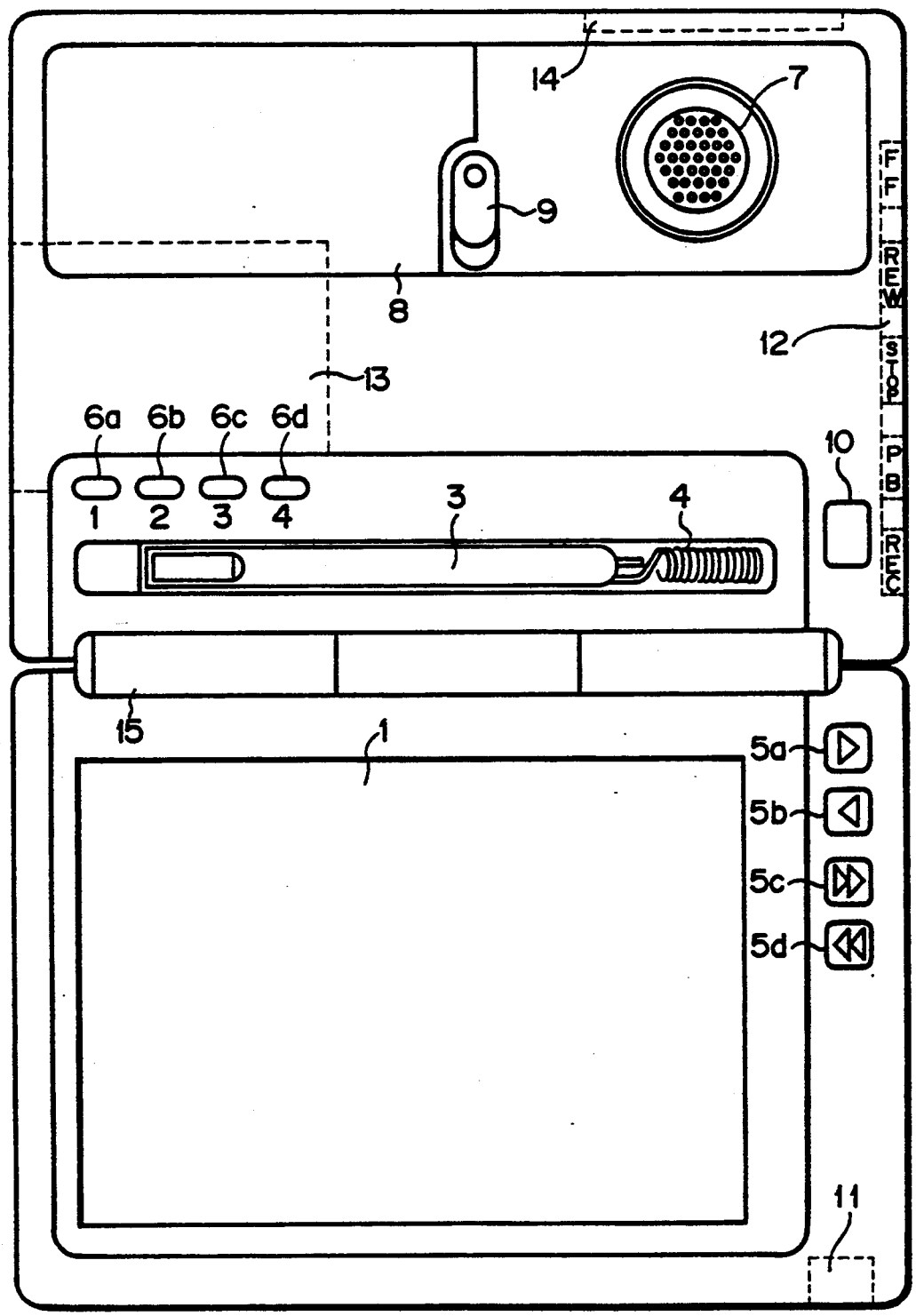
FIG. 1 is a front view of an embodiment of a data processing apparatus according to the present invention.

An embodiment of a data processing apparatus according to the present invention will hereinafter be described in detail with reference to FIGS. 1 to 4. FIG. 1 is a front view of the data processing apparatus according to the present invention. In this case, the data processing apparatus of the present invention is applied to, for example, a so-called portable computer of a very small type.

Referring to FIG. 1, there is shown a display apparatus formed of a liquid crystal display device (LCD) or the like, that is, a display portion 1. The display portion 1 is adapted to display thereon video image data from the CPU, which will be described later. An input apparatus, i.e. an input tablet 2 formed of a so-called transparent touch sensor or the like, is mounted on the surface of the display portion 1.

A pen 3 is adapted to input desired data or the like in cooperation with the input tablet 2. The pen 3 incorporates therein a sensing or detecting means for detecting the change of electrostatic capacity between the input tablet 2 and the point of the pen 3, though not shown. Coordinate data of the pen 3 can be detected even when the point of the pen 3 is not brought in contact with the surface of the input tablet 2 and, a marker (not shown) is displayed on the display portion 1 at its position in which the point of the pen 3 is opposed to the input tablet 2. When the user holds this pen 3 and touches the input tablet 2 with the point of the pen 3, information such as a contacted condition, contacted position and so on are supplied through a cord 4 or the like to the CPU. Accordingly, desired data or the like is input. Signals from predetermined key switches 5a, 5b, 5c, 5d and 6a, 6b, 6c, 6d are also supplied to the CPU.

A speaker 7 is provided on the upper portion of this data processing apparatus and a battery accommodating portion 8 is adapted to accommodate a power source battery in the inside of a lid which is opened and closed by a locking mechanism 9. In FIG. 1, reference numeral 10 designates a power switch which powers this data processing apparatus when depressed.

Dashed lines on the upper and lower portion of FIG. 1 represent positions of mechanisms and the like provided at the side of this data processing apparatus.

Referring to FIG. 1, a dashed line block 11 represents a microphone and dashed line blocks 12 represent operation keys that are used to effect the solid state recording which will be described later. When the operation key 12 is operated, an audio signal fed to the microphone 11 is recorded and emanated from the above-described speaker 7. A dashed line block 13 depicts a socket into which an IC card such as a read only memory (ROM), a random access memory (RAM) or the like is inserted and connected. A dashed line block 14 depicts a position of a socket which is used to connect this data processing apparatus with an external apparatus when the user wants to expand the system of this data processing apparatus.

A hinge 15 incorporates therein a flexible substrate or the like by which a signal is transmitted. By means of the hinge 15, the data processing apparatus of the invention can be folded into two portions without being affected by troubles from an electrical standpoint. When this data processing apparatus is in use, the data processing apparatus is about 29 cm long and about 20.5 cm wide in its unfolded state and is about 4 cm thick in its folded state. The display portion 1 is about 15 cm wide and about 10 cm long.

Figure 2:
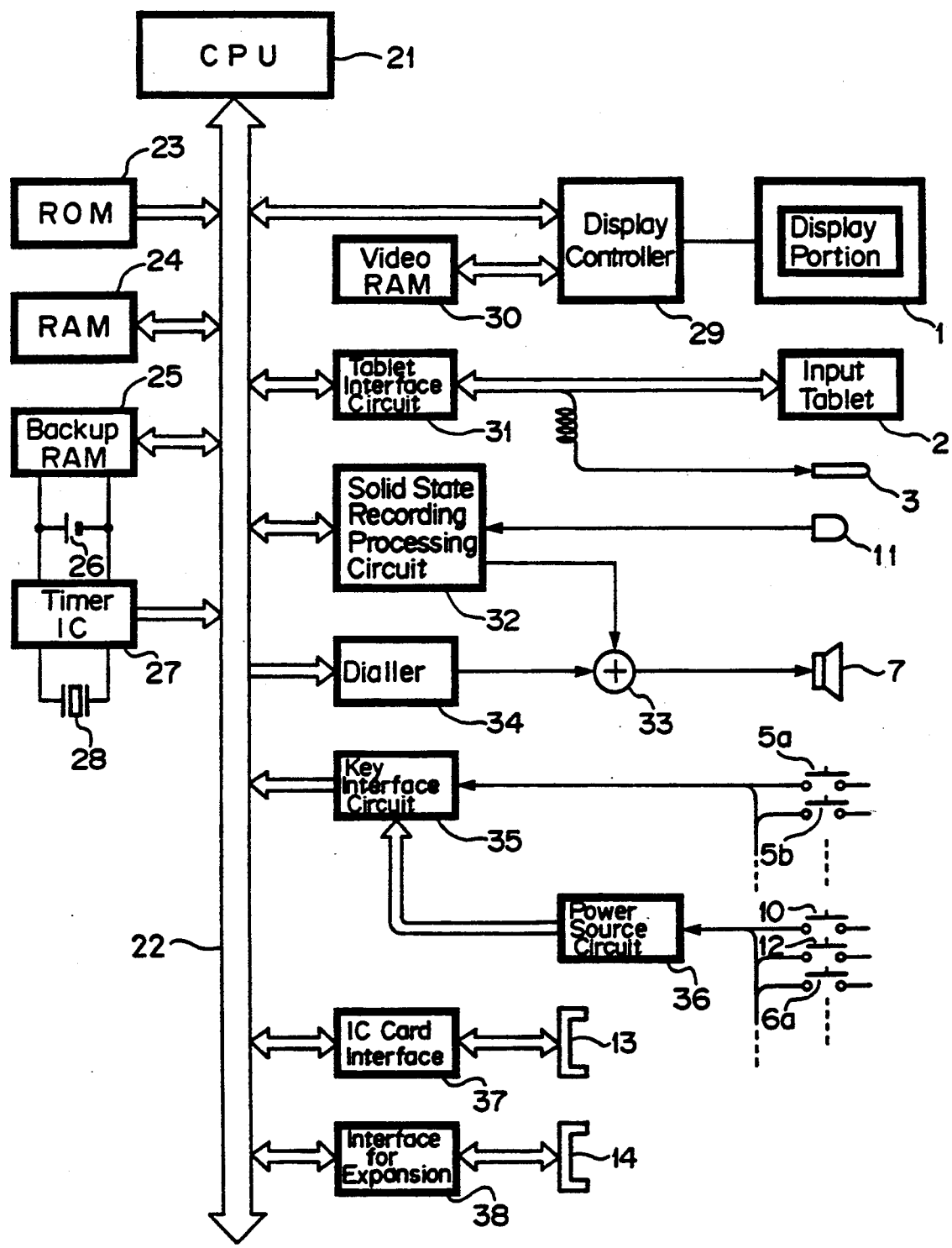
FIG. 2 is a systematic block diagram showing a hardware of the data processing apparatus according to the present invention.

In this data processing apparatus, the hardware incorporated therein is arranged as shown in a block diagram forming FIG. 2.

Referring to FIG. 2, reference numeral 21 designates the central processing unit (CPU) which is connected with various function ICs by way of a bus line 22. That is, a ROM 23 is connected to the CPU 21 and this ROM 23 stores therein, in addition to a system program for the entire system of this data processing apparatus a, Japanese syllabary-Japanese character conversion program for a word processor for Japanese language and dictionary data, a recognition program for recognizing hand-written input and dictionary data and so on.

A RAM 24 is used as a RAM for work area and a backup RAM 25 is connected with a power source 26.

A timer IC 27 is driven by the power source 26, and this timer IC 27 counts a clock from a quartz oscillator 28 and always outputs data of date and time at each timing point.

The hardware of this data processing apparatus will be described in association with the connection relations of the respective portions shown in the front view of FIG. 1.

A display controller 29 is adapted to control the display portion 1. The display controller 29 is controlled by the CPU 21 and display data formed by the CPU 21 is written in a V-RAM (video RAM) 30. The data written in the V-RAM 30 is supplied to the display portion 1 through the display controller 29.

A tablet interface circuit 31 is formed as one body with the display portion 1 for the input tablet 2 and the pen 3. Data written in the input tablet 2 or the like is supplied to the CPU 21 by means of the tablet interface circuit 31.

A solid state recording processing circuit 32 is adapted to process the audio signal from the microphone 11 in a predetermined processing manner such as an analog-to-digital (A/D) conversion or the like and the thus processed signal is written in the backup RAM 25 via the CPU 21. Audio signal data stored in the backup RAM 25 is supplied to the processing circuit 32, in which it is processed in a predetermined processing manner, such as a digital-to-analog (D/A) conversion or the like. The thus processed signal is supplied to the speaker 7 via a mixer 33.

A dialler circuit 34 is adapted to generate an acoustic signal corresponding to a dual tone signal of a so-called push-phone when receiving data of a desired telephone number or the like from the CPU 21. This signal is supplied through the mixer 33 to the speaker 7.

A key interface circuit 35 is supplied with a signal from the key switch group such as the above-described key switches 5a to 5d, 6a to 6d, 10 and 12 or the like directly or by way of a power source circuit 36. The signal converted in the predetermined manner is supplied from this key interface circuit 35 to the CPU 21. The signals of the power switch 10, the key switches 6a to 6d and the operation keys 12 except the stop button are supplied to the key interface circuit 35 through power source circuit 36 so that, when these key switches are operated, the power source circuit 36 is actuated first and then the information of the key operation is supplied to the key interface circuit 35.

An interface circuit 37 and an interface circuit 38 are adapted to couple the IC cards to the external apparatus upon expansion. The interface circuits 37 and 38 are coupled to the sockets 13 and 14, respectively.

Figure 3A:
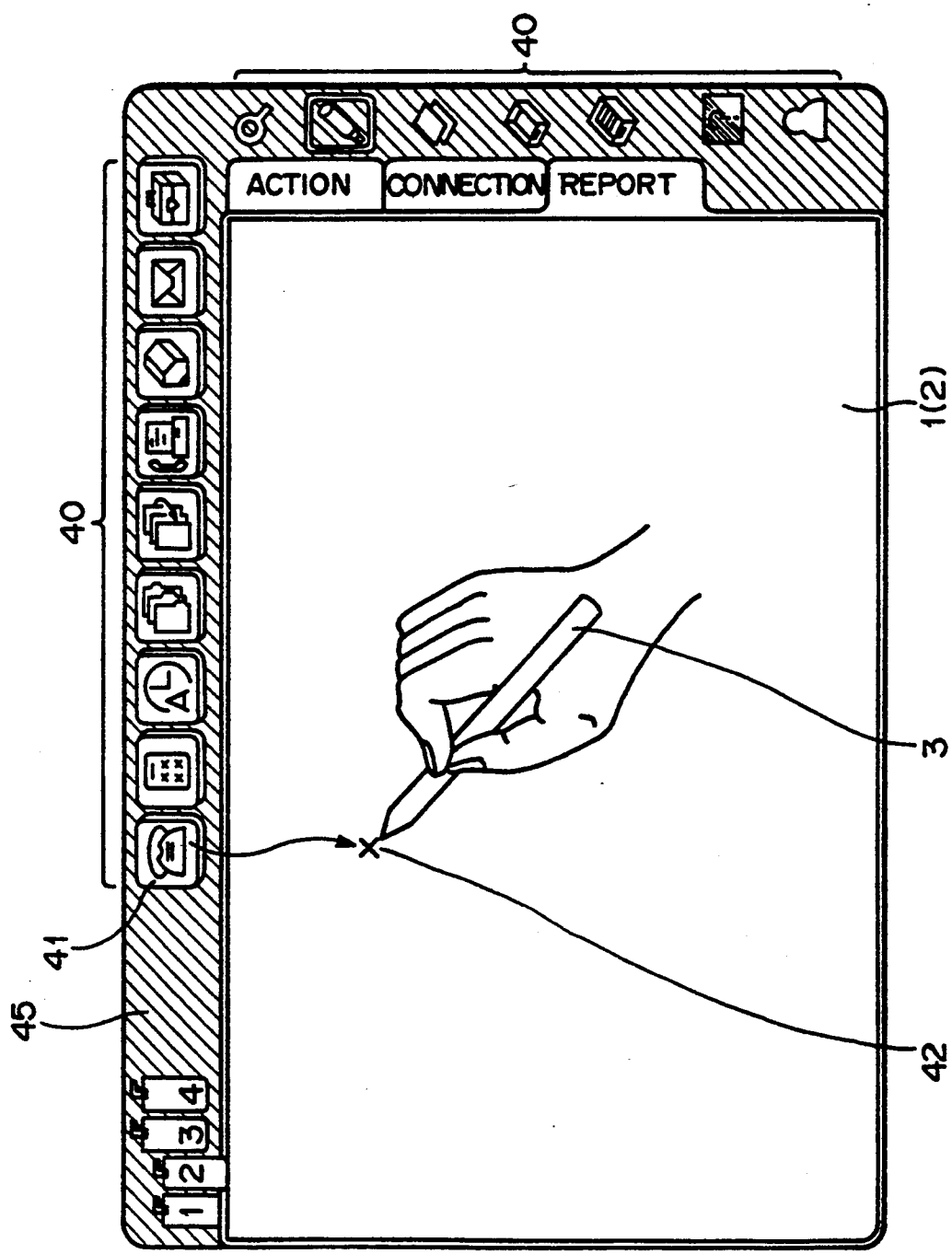
FIGS. 3A and 3B are front views illustrating a display screen of a display portion of the data processing apparatus according to the present invention, respectively.
Figure 3B:
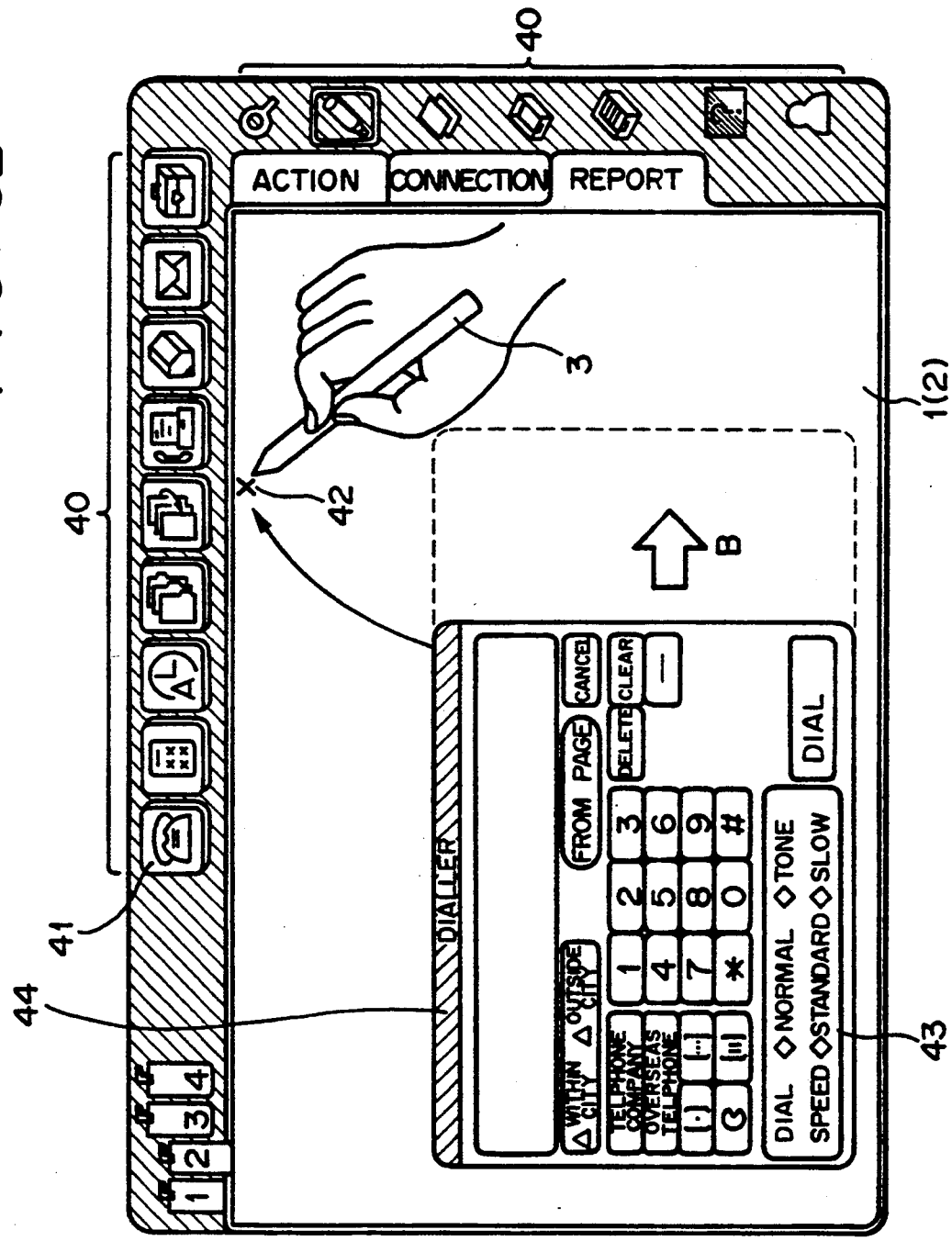

In the above-described data processing apparatus of this embodiment., when the power switch 10 shown in FIG. 1 is depressed, icon groups 40 which make various processings possible are displayed on the display portion 1 as shown in FIG. 3A. When a desired processing, for example, a dialler processing, from a plurality of these icon groups 40 is executed, the user touches an icon 41 on which a picture of a telephone is drawn in various icon groups 40 with the point of the pen 3. Since as the point of the pen 3 approaches the panel surface of the display portion 1 serving as the input tablet 2 a cross-shaped position designating cursor 42 is displayed on the picture screen of the display portion 1, the user can visually confirm the exact position of the point of pen 3 on the input tablet 2 very clearly. Then, if the user moves (i.e. drags) the point of the pen 3 to the display position on the surface of the input tablet 2 without being separated therefrom after having touched the desired icon 41 with the point of the pen 3, and takes the point of the pen 3 off from the surface of the input tablet 2, an icon (hereinafter be referred to as a window) enlarged in the form of the processing display mode of the desired icon 41 is automatically displayed on the display portion 1 as shown in FIG. 3B.

This operation is carried out by the CPU 21 shown in FIG. 2. Let us explain this operation more fully with reference to a flow chart forming FIG. 4A.

Figure 4A:
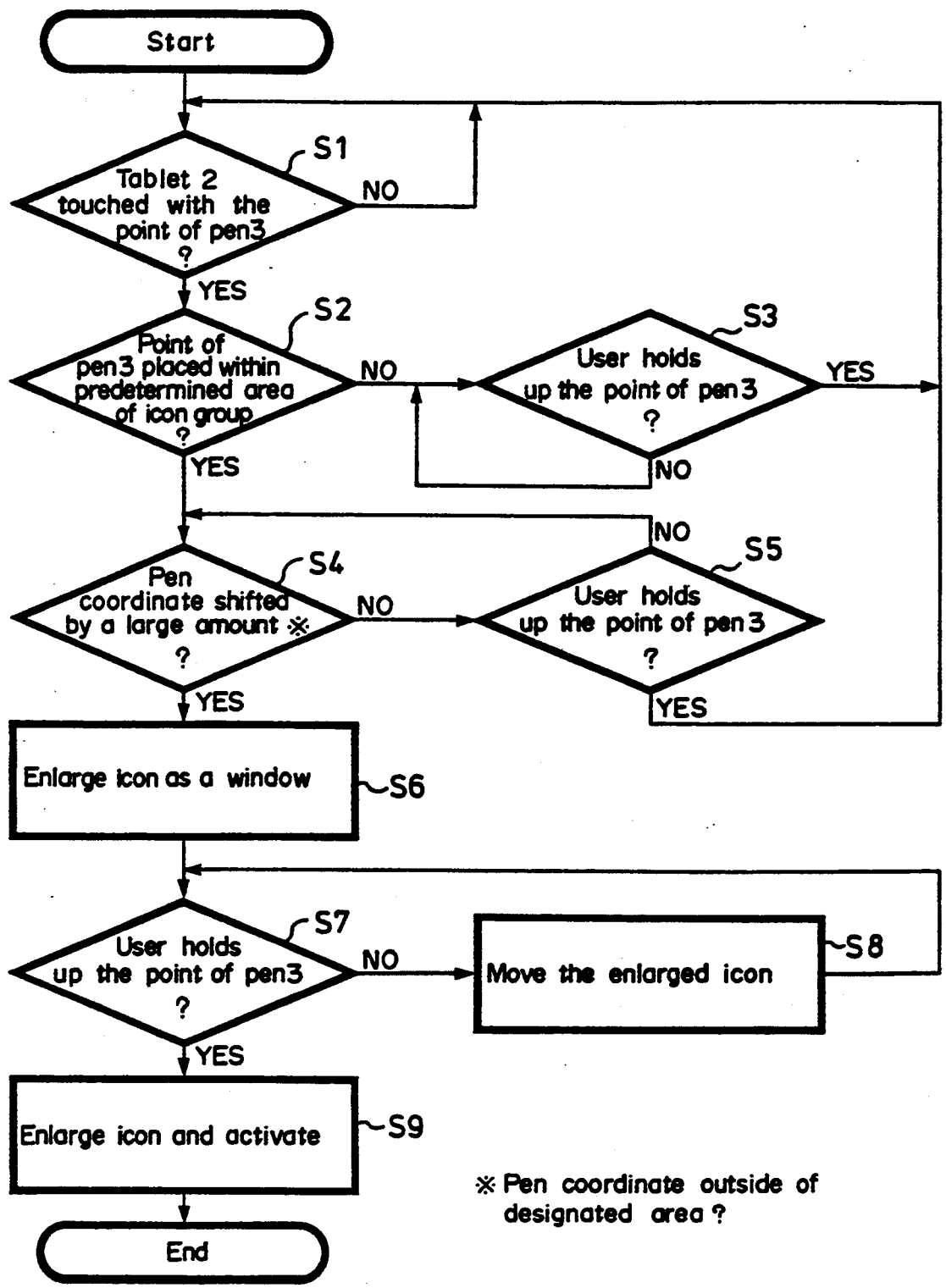
FIGS. 4A and 4B are flow charts to which reference will be made in explaining an operation of the data processing apparatus according to the present invention.

Referring to FIG. 4A, following the Start of operation, it is determined in decision step S1 by the CPU 21 whether or not the user touches the surface of the input tablet 2 with the point of the pen 3. When the input tablet 2 is touched with the point of the pen 3, a switch (not shown) provided within the pen 3 is operated, and this operation signal is transmitted to the CPU 21 through the tablet interface circuit 31. If the input tablet 2 is not touched with the point of the pen 3 as represented by a NO at step S1, the routine returns to first step S1. If on the other hand the input tablet 2 is touched with the point of the pen 3 as represented by a YES at step S1, then the routine proceeds to the next decision step S2. It is determined in step S2 whether or not the point of the pen 3 is placed down within a predetermined area of the icon groups 40. If a NO is output at step S2, then the routine proceeds to decision step S3. It is determined at step S3 whether or not the user holds up the pen 3 from the surface of the input tablet 2. If a YES is output at step S3, the routine returns to first step S1. If a NO is output at step S3, then the routine returns to step S3. During this period, other operations except the operation in which the icon is enlarged (icon is enlarged in the form of window) are executed. If the pen 3 is placed down within the area of the icon group 40 as represented by a YES at step S2, then the routine proceeds to the next decision step S4 whereat it is determined whether or not the pen coordinate is shifted from a designated value by a large amount. This decision is made by comparing the shifted amount of the pen coordinate with a reference shift amount stored in the memory, such as the ROM 23 or the like. Alternatively, it may be determined in step S4 whether or not the pen coordinate is out of the designated area as shown by an asterisk. In that case, the decision is made by comparing the shifted amount with the designated area stored in the memory.

If a NO is output at step S4, then the routine proceeds to the next decision step S5 whereat it is determined whether or not the user holds up the pen 3 from the surface of the input tablet 2. If a NO is output at step S5, the routine returns to step S4. If a YES is output at step S5, the routine returns to first step S1. If the pen coordinate is considerably shifted from the reference moving amount, or if the pen coordinate is outside of the predetermined designated area (e.g., the hatched area in this embodiment) as represented by a YES at step S4, then the routine proceeds to step S6. In step S6, the processing display form of the icon 41 designated is enlarged as a window 43 shown in FIG. 3B. It is needless to say that under this state the point of the pen 3 touches the panel surface of the input tablet 2 so that, even when the user touches respective menus displayed on the window 43, the CPU 21 can be inhibited from being operated.

Then, the processing of the CPU 21 proceeds to the next decision step S7 whereat it is determined whether or not the user holds up the pen 3 from the panel surface of the input tablet 2. If a NO is output at step S7, then the routine proceeds to step S8. In step S8, when the user wants to move the window 43 shown, for example, in FIG. 3B to the central position of the display portion 1 as shown by an arrow B in FIG. 3B, the user moves the point of the pen 3 in the arrow B direction and drags the pen 3 to the position shown by the broken line, then the large display icon, i.e. the window 43 is moved to the position shown by the broken line in FIG. 3B. At the completion of step S8, the routine, of course, returns to step S7. If it is determined that the user holds up the pen 3 from the panel surface of the input tablet 2 as represented by a YES at step S7, then the processing proceeds to step S9 whereat the icon is activated so that various processing menus within the window 43 can be executed. Then, the routine is ended.

When the user wants to bring the large icon, i.e. the window 43 displayed on the display portion 1 as shown in FIG. 3B back to the original position, if the user touches the portion other than the function operation portion, for example, a hatched upper edge portion 44 within the window 43 with the point of the pen 3 and drags the point of the pen 3 back to the telephone icon 41 of the original icon group 40 without being apart from the tablet, then the icon of-large size can be returned to and stored in that position. In this operation, the pen 3 need not be always returned to the telephone icon 41, but if the pen 3 is returned to a predetermined icon in the icon group 40, then the window can automatically be stored in the vacant icon position. The abovementioned operation will be explained more fully with reference to the flow chart forming FIG. 4B.

Figure 4B:
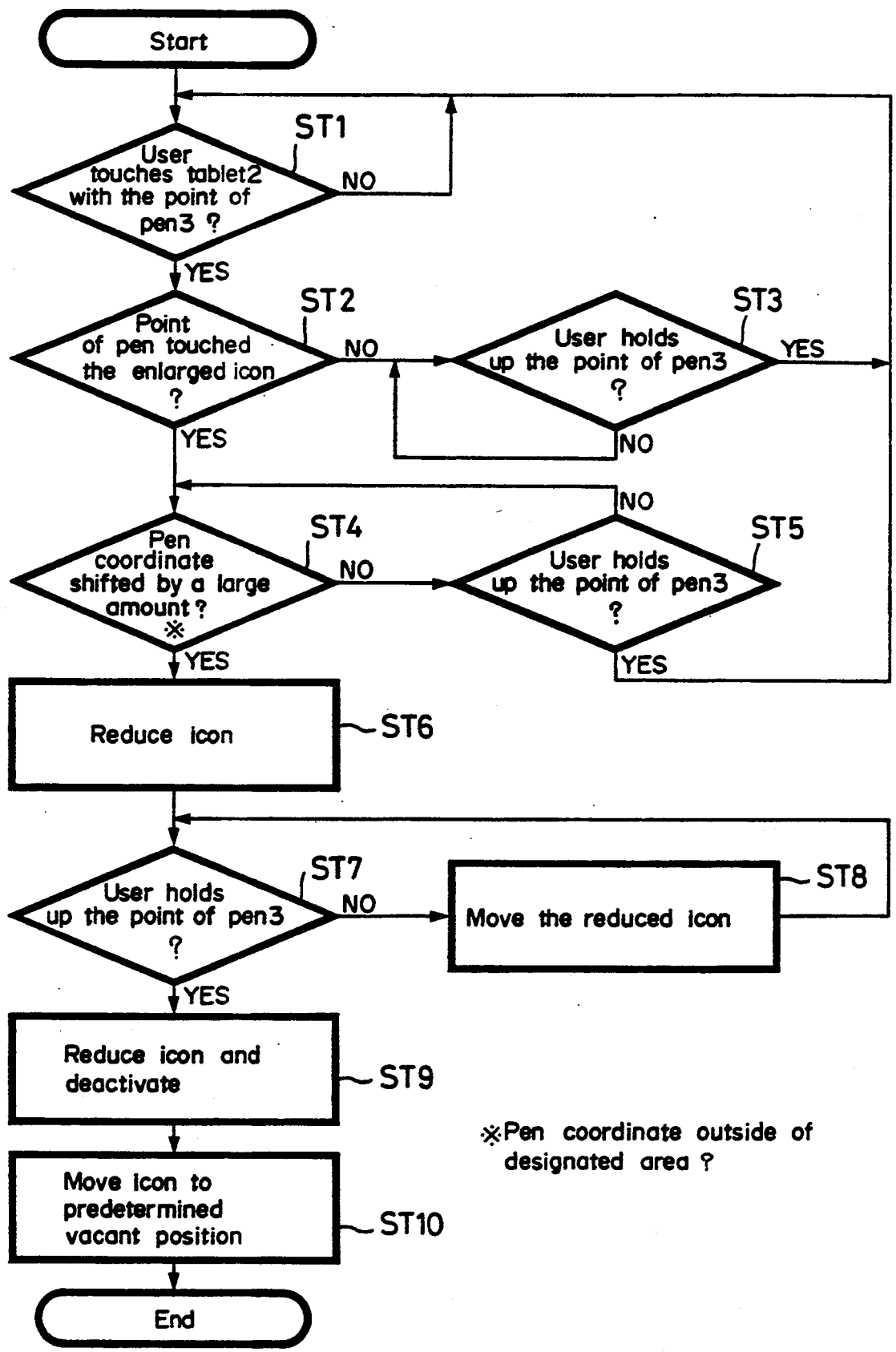

Referring to FIG. 4B, following the Start of operation, it is determined by the CPU 21 in decision step ST1 whether or not the user touches the input tablet 2 with the point of the pen 3. If a NO is output at step ST1, then the routine returns to decision step ST1. If on the other hand a YES is output at step ST1, the routine proceeds to the next decision step ST2. It is determined in decision step ST2 whether or not the point of the pen 3 touches the large icon, i.e. the upper edge portion 44 of, for example, the window 43 shown in FIG. 3B and the point of the pen 3 is located within the predetermined area, except for the function button group of the window 43. If a NO is output at step ST2, the routine proceeds to step ST3 wherein the processing similar to that of step S3 of FIG. 4A is performed. If the point of the pen 3 is located within the window 43 as represented by a YES at step ST2, then the routine proceeds to steps ST4 and ST5. These steps ST4 and ST5 are similar to steps S4 and S5 of FIG. 4A. If a YES is output at step ST4, or if the pen coordinate is shifted from the designated value by a very large amount, or if the point of the pen 3 is outside of the designated area, then the routine proceeds to step ST6 wherein the icon (the window in this case) is reduced in size under the control of the CPU 21.

In the next decision step ST7, it is determined whether or not the user holds the pen 3 up from the panel surface of the input tablet 2. If a NO is output at step ST7, the routine proceeds to step ST8 wherein the icon displayed as the reduced icon is moved, and the routine returns to step ST7. If it is determined in step ST7 that the user holds the pen 3 up from the panel surface of the input tablet 2, then the routine proceeds to step ST9 wherein the icon is deactivated, and the routine proceeds to step ST10. In step ST10, the icon is moved to the predetermined vacant position and the processing is ended.

Since the data processing apparatus of the present invention is constructed and operated as described above, the user can activate or deactivate the designated function only by dragging the pen 3. Further, according to the data processing apparatus of this embodiment, the starting and ending positions of the dragging of the pen 3 can be designated naturally, and the window position or the icon position to be enlarged can be determined with ease.

As set out above, according to the data processing apparatus of the present invention, the icon and the window can be designated by one operation in which the user touches the panel surface of the input tablet 2 with the point of the pen 3 and drags the same along the panel surface of the input tablet 2 so that the cumbersome operation can be removed, and the starting and ending of the dragging operation of the pen 3 can be carried out very clearly. Furthermore, the present invention can achieve various effects, such as when the window can be easily designated, and so on.

Having described a preferred embodiment of the invention with reference to the accompanying drawings, it is to be understood that the invention is not limited to that precise embodiment and that various changes and modifications thereof could be effected by one skilled in the art without departing from the spirit or scope of the novel concepts of the invention as defined in the appended claims.

We claim as our invention:

1. A data processing apparatus with improved icon display, comprising:
   a display portion with an input device arranged thereon;
   a pen means for touching the display portion to input information;
   means for detecting when and where said pen means touches said display portion;
   means for displaying at least one icon on the display portion;
   means for providing an icon processing display mode window corresponding to said icon displayed on said display portion; and
   means for displaying the icon processing display mode window by first touching said icon on said display portion with said pen means, then dragging the pen means across the display portion to a location at which the icon processing display mode window is to be displayed, and then lifting the pen means away from the display portion at which time the window is then displayed.

2. An apparatus according to claim 1 wherein means is provided such that when said pen means approaches within a certain distance of said display portion, it is considered that the pen means has touched the display portion so that it is not necessary that the pen means always actually touch the display portion when enabling the icon processing display mode window.

3. An apparatus according to claim 1, wherein means is provided for moving the icon processing display mode window after it has been displayed on the display portion by touching the pen means onto the icon processing display mode window and then dragging the pen means across the display portion until a final position is reached for the icon processing display mode window and then lifting the pen means away from the display portion, said icon processing display window being repositioned in accordance with a new lift away position of the pen means.

4. An apparatus according to claim 3 wherein a portion of the icon processing display mode window is designated as a function operating portion and another predetermined area is designated for touching by the pen means when moving the icon processing display mode window.

5. A data processing apparatus with improved icon display, comprising:
   a display portion with an input device arranged thereon;
   a pen means for touching the display portion to input information;
   means for detecting when and where said pen means touches said display portion;
   means for displaying at least one icon on the display portion;
   means for providing an icon processing display mode window corresponding to said icon displayed on said display portion; and
   means for removing the icon processing display mode window displayed on the display portion by first touching said icon processing display mode window on said display portion with said pen means, then dragging the pen means across the display portion to a location at which the icon is being displayed on the display portion, and then lifting the pen means away from the display portion, at which time the icon processing display mode window is no longer displayed on said display portion and is converted into said icon.

6. An apparatus according to claim 5 wherein means is provided such that when said pen means approaches within a certain distance of said display portion, it is considered that the pen means has touched the display portion so that it is not necessary that the pen means always actually touch the display portion when converting the icon processing display mode window into the icon.

7. An apparatus according to claim 5 wherein a portion of the icon processing display mode window is designated as a function operating portion and another predetermined area is designated for touching by the pen means when converting the icon processing display mode window into the icon.

* * * * *